US008744949B2

(12) United States Patent
Buckwalter

(10) Patent No.: US 8,744,949 B2
(45) Date of Patent: Jun. 3, 2014

(54) METHOD AND APPARATUS FOR PROCESSING AND ROUTING TRANSACTIONS

(75) Inventor: Alan M Buckwalter, Glen Rock, NY (US)

(73) Assignee: Goldman, Sachs & Co., New York, NY (US)

( * ) Notice: Subject to any disclaimer, the term of this patent is extended or adjusted under 35 U.S.C. 154(b) by 44 days.

(21) Appl. No.: 13/369,959

(22) Filed: Feb. 9, 2012

(65) Prior Publication Data

US 2012/0143745 A1 Jun. 7, 2012

Related U.S. Application Data

(63) Continuation of application No. 10/246,561, filed on Sep. 18, 2002, now Pat. No. 8,140,420.

(60) Provisional application No. 60/365,040, filed on Mar. 15, 2002.

(51) Int. Cl.
*G06Q 40/00* (2012.01)
*G06Q 40/06* (2012.01)

(52) U.S. Cl.
CPC .................................... *G06Q 40/06* (2013.01)
USPC ....................................................... 705/36 R

(58) Field of Classification Search
USPC ..................................................... 705/35–45
See application file for complete search history.

(56) References Cited

U.S. PATENT DOCUMENTS

| 4,412,287 | A | 10/1983 | Braddock, III |
| 4,674,044 | A | 6/1987 | Kalmus et al. |
| 4,677,552 | A | 6/1987 | Sibley, Jr. |
| 4,823,265 | A | 4/1989 | Nelson |
| 5,168,446 | A | 12/1992 | Wiseman |
| 5,517,406 | A | 5/1996 | Harris et al. |
| 5,873,071 | A | 2/1999 | Ferstenberg et al. |
| 5,963,923 | A | 10/1999 | Garber |
| 6,016,483 | A | 1/2000 | Rickard et al. |
| 6,029,146 | A | 2/2000 | Hawkins et al. |
| 6,105,005 | A | 8/2000 | Fuhrer |
| 6,131,087 | A | 10/2000 | Luke et al. |
| 6,134,535 | A | 10/2000 | Belzberg |
| 6,195,647 | B1 | 2/2001 | Martyn et al. |
| 6,247,000 | B1 | 6/2001 | Hawkins et al. |
| 6,278,982 | B1 | 8/2001 | Korhammer et al. |
| 6,317,728 | B1 | 11/2001 | Kane |
| 6,347,307 | B1 | 2/2002 | Sandhu et al. |
| 6,829,589 | B1 * | 12/2004 | Saliba .......................... 705/36 R |
| 2001/0042040 | A1 * | 11/2001 | Keith .............................. 705/37 |

(Continued)

OTHER PUBLICATIONS

Chapman, Peter. (Mar. 2000). Quality Control at Mother Merrill: Spending Big Bucks to Obtain Best Execution. Traders Magazine, 1. Retrieved Oct. 8, 2010, from Banking Information Source. (Document ID: 50963688).

(Continued)

*Primary Examiner* — Shahid R Merchant
(74) *Attorney, Agent, or Firm* — Perkins Coie LLP

(57) ABSTRACT

Option orders are processed by receiving an option order, the option order including information identifying a customer, and information identifying a desired option. One of a plurality of option exchanges is selected to complete the option order, the selecting based on information identifying the customer and the desired option. In some embodiments, a routing rule is selected based on the information identifying a customer.

19 Claims, 5 Drawing Sheets

(56) References Cited

U.S. PATENT DOCUMENTS

| | | | |
|---|---|---|---|
| 2001/0044767 A1 | 11/2001 | Madoff et al. | |
| 2001/0044770 A1 | 11/2001 | Keith | |
| 2001/0051909 A1 | 12/2001 | Keith | |
| 2002/0059107 A1* | 5/2002 | Reich et al. | 705/26 |
| 2002/0091606 A1* | 7/2002 | Shapiro | 705/36 |
| 2002/0138401 A1* | 9/2002 | Allen et al. | 705/37 |
| 2002/0156719 A1 | 10/2002 | Finebaum et al. | |
| 2002/0194115 A1 | 12/2002 | Nordlicht et al. | |
| 2003/0130926 A1* | 7/2003 | Moore et al. | 705/37 |

OTHER PUBLICATIONS

Chicago Board Options Exchange Website http://web.archive.org/web/20001217040300/www.cboe.com/education/basics.htm.

Editorial Staff. "Trade Monitoring Professionals." Traders Magazine. Aug. 1, 2001: Banking Information Source, ProQuest. Web. May 25, 2011.

"Investor Tips: Trade Execution", U.S. Securities and Exchange COmission, download from http://www.sec.gov/investor/pubs/tradexec.html on Sep. 25, 2003. 4pgs.

Louis, Brian "Options Linkage Plan Won't Provide Instant Solution", TheStreet.com, Jul. 28, 2000, download from http://www.thestreet.com/pf/stocks/brokerages/1019385.html on Sep. 25, 2003. 2pgs.

Rini, Bill et al "Subject: Trade—Order Routing and Payment for Order Flow", The Investment FAQ, Last-Revised Nov. 25, 1999, download from http://invest-faq.com/articles/trade-order-routing.html on Sep. 25, 2003. 5pgs.

Rule 11Ac1-5, Jonathan Katz, U.S. Securities and Exchange Commission, Nov. 17, 2000, pp. 1-68.

Rule 11Ac1-7, Jonathan Katz, U.S. Securities and Exchange Commission, Nov. 17, 2000, pp. 1-66.

"SRO Rulemaking, Supplementary Material: Chicago Board Options Exchange Options Linkage Plan", U.S. Securities and Exchange Commission, Jan. 19, 2000, download from http://www.sec.gov/rules/extra/cboc.htm on Sep. 25, 2003. 29pgs.

www.sec.gov website, Trade Execution: What Every Investor Should Know.

Arvedlund, Erin E., "The Striking Price: Pay for Play," Barron's, vol. 80, Issue 20, 2 pages, May 15, 2000.

* cited by examiner

| CUSTOMER IDENTIFIER 502 | SYMBOL 504 | SIZE 506 | EXCHANGE 508 |
|---|---|---|---|
| C1001 | IBM | 0 | A, W, I |
| C1001 | IBM | 50 | W, P, A |
| C1001 | AOL | 0 | W, I, X |
| C1002 | IBM | 100 | I, W, A |
| C1003 | AOL | 0 | I, W, X |

METHOD AND APPARATUS FOR PROCESSING AND ROUTING TRANSACTIONS

RELATED APPLICATIONS

This application is a Continuation of and claims priority under 35 U.S.C. §120 to U.S. patent application Ser. No. 10/246,561, filed Sep. 18, 2002 and entitled "Method and Apparatus for Processing and Routing Transactions," which in turn claims priority to U.S. Provisional Application Ser. No. 60/365,040, filed Mar. 15, 2002 and entitled "Method and Apparatus for Processing and Routing Transactions." This application is related to co-pending and commonly assigned U.S. patent application Ser. No. 10/246,562, filed Sep. 18, 2002, entitled "Method and Apparatus for Monitoring and Evaluating Trade Activity", the contents of each of which are expressly incorporated by reference herein in their entirety.

FIELD

The present invention relates to systems, methods, apparatus, computer program code and means to process and route transactions. More particularly, embodiments of the present invention relate to systems, methods, apparatus, computer program code and means to process and route transactions involving options.

BACKGROUND

In the United States, exchange-trading of options has existed in a standardized, regulated marketplace since the 1970's. An option is essentially a contract giving a buyer the right, but not the obligation, to buy or sell shares of an underlying security at a specific price for a specific time. Since the 1970's a number of exchanges have been formed, including the Chicago Board Options Exchange (the "CBOE"), the American Stock Exchange (the "AMEX"), the Pacific Stock Exchange (the "PCSE"), the International Securities Exchange (the "ISE"), and the Philadelphia Stock Exchange (the "PHLX"). In general terms, four specifications describe an options contract: the type of the option (e.g., a put or a call), the premium (or the initial amount paid on the contract), the underlying security (or the security, such as an equity, which must be delivered or purchased if the option is exercised), and a contract expiration date.

Unlike other exchange-traded securities, which can generally be traded on equal terms at any exchange, many options trade differently at different exchanges. The variations can include differences in price, execution time, liquidity, etc. For example, an option whose underlying security is IBM, Corp. stock may be traded on several exchanges, however, there may be slightly different order pricing and execution characteristics associated with trades at different exchanges. IBM options at the ISE, for example, may be trading at the National Best Bid and Offer ("NBBO"—a dynamically updated price which shows a security's highest bid and lowest offer among all exchanges and market makers registered to trade in that security), while IBM options at the AMEX may be slightly higher than the NBBO.

Currently, an entity desiring to execute an options trade in the U.S. submits an option order to a broker. The broker transmits the order to one of the five above-identified options exchanges for completion. The broker generally chooses to submit the order to a particular specialist or trading desk at a particular exchange with which the broker has a prior relationship. Unfortunately, the exchange to which the order is submitted may not have NBBO pricing or it may not have the best NBBO pricing. Further, the exchange may not have good liquidity with the particular option involved in the order. As a result, the entity which submitted the trade request may not receive the best execution of the trade that he may have if the broker had transmitted the order to a different exchange. It would be desirable to provide an options system which addresses deficiencies associated with existing option systems.

SUMMARY

To alleviate problems inherent in the prior art, embodiments of the present invention introduce systems, methods, apparatus, computer program code and means for processing and routing transactions. According to some embodiments, option orders are processed by receiving an option order, the option order including information identifying a customer, and information identifying a desired option. One of a plurality of option exchanges is selected to complete the option order, the selecting based on information identifying the customer and the desired option. In some embodiments, a routing rule is selected based on the information identifying a customer.

Systems, methods, apparatus, computer program code and means for processing an options order including data identifying said customer, an underlying security, and an amount, are also provided where the customer communicates at least a first routing rule to a routing system, and transmits the options order to the routing system and causing the routing system to route the options order to an options exchange based on a comparison of the at least first routing rule to the options order.

Systems, methods, apparatus, computer program code and means for processing option orders are also provided where an option order is received, the option order including information identifying a customer, and information identifying a desired option. A set of routing rules associated with the customer is identified. A determination that the set of routing rule lacks explicit routing instructions for the option is made, and national best bid and offer (NBBO) data for the option is identified, the NBBO data including data identifying a first exchange having pricing for the option near NBBO pricing. The option order is routed to the first exchange.

With these and other advantages and features of the invention that will become hereinafter apparent, the invention may be more clearly understood by reference to the following detailed description of the invention, the appended claims, and the drawings attached herein.

DETAILED DESCRIPTION

Figure 1:
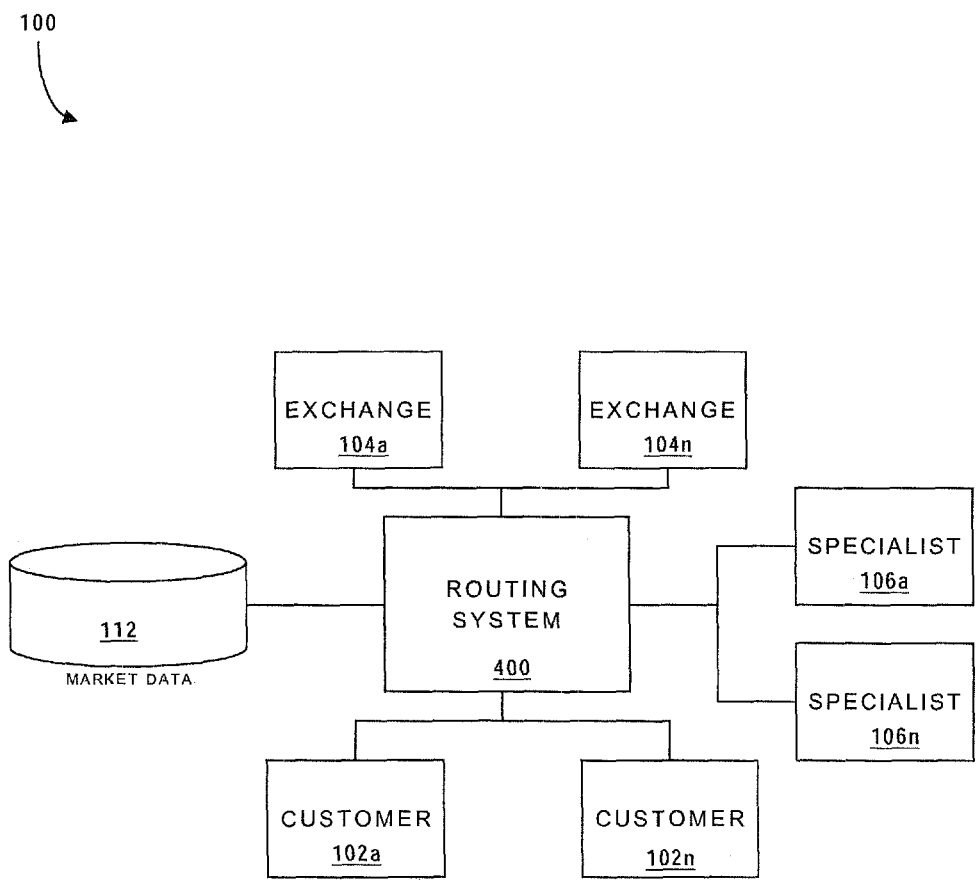
FIG. 1 is a block diagram of a system consistent with the present invention.

Applicants have recognized that there is a need for a system, method, apparatus, computer program code, and means to process and route transactions involving option orders.

For the purposes of describing features of embodiments of the present invention, a number of terms are used herein. For example, the term "option" is used herein to refer to a contract which gives a buyer the right, but not the obligation, to buy or sell shares of the underlying security or index at a specific price for a specified time. In the description presented herein, the underlying securities described are equity securities or "stocks". Stock option contracts generally are for 100 shares of the underlying stock.

As used herein, the terms "exchange" or "options exchange" are used to refer to any securities exchange which lists and facilitates the trading of options. For example, currently in the U.S., listed options are traded on the following national securities exchanges: the CBOE (exchange symbol "W"), the AMEX (exchange symbol "A"), the PCSE (exchange symbol "P"), the ISE (exchange symbol "I") and the PHLX (exchange symbol "P"). Embodiments of the present invention may be used to route and facilitate trading of options on other exchanges as well (including non-U.S. exchanges), and the terms "exchange" or "options exchange" are not intended to be limited to the above-identified exchanges.

As used herein, the term "specialist" includes registered competitive market makers, specialists, primary market makers and other registered securities dealers which maintain firm bids and offers by standing ready to buy or sell contracts of securities and which announce their pricing throughout the day.

In general, and for the purposes of introducing concepts of embodiments of the present invention, option orders may be processed as follows. A customer (directly or through a brokerage, for example) creates an option order and forwards the order to trading system for execution. The trading system, pursuant to embodiments of the present invention, is in communication with an order routing system configured to route option orders to various exchanges. The order routing systems applies one or more routing rules to the option order to route the order to a particular options exchange for execution. For example, an option order to purchase 100 contracts of IBM options may be routed to either the CBOE, the PCSE, or the PHLX, depending on the routing rules applied to the option order. For example, as will be described further below, the customer presenting the option order may particularly specify that all IBM be routed to the CBOE. As another example, the routing rules may indicate that all IBM be routed to a particular exchange if the exchange offers a price near (e.g., within a specified number of ticks or within a specified tolerance of) the National Best Bid and Offer (NBBO) price for the particular option. Other examples of routing rules will be described further below. In this manner, embodiments of the present invention allow customers greater control and flexibility over the processing of their routing orders. Further, better execution and pricing is achieved by routing orders to exchanges which offer the best pricing and execution quality. Other features and advantages will be apparent to those skilled in the art.

Features of some embodiments of the present invention will now be described by first referring to FIG. 1 where a block diagram of one embodiment of a trading system 100 is shown. As shown, trading system 100 includes a number of different components which cooperatively operate to process and route option orders pursuant to some embodiments of the present invention. As depicted, trading system 100 includes a routing system in communication with a number of customers 102*a-n*, a number of exchanges 104*a-n* and one or more sources of market data 112. In a typical implementation, trading system 100 may also include an execution core (not shown). Customer orders submitted are submitted to the execution core where they are entered into the brokers system, timestamped, and assigned an order number. Routing system 400, in some embodiments, interacts with the execution core to process customer orders. Any of a number of execution cores may be used, such as, for example, the Redi® system offered by Spear, Leeds & Kellogg (a division of Goldman Sachs & Co). Other execution cores may also be used in conjunction with the routing system of the present invention.

Although a single routing system 400 is shown in FIG. 1, any number of these devices may be included in trading system 100. Similarly, any number of market data sources 112, customer devices 102, exchange devices 104 or any other device described herein may be included in the trading system 100 according to some embodiments of the present invention.

Each of the devices of system 100 may be formed of components or other devices capable of performing the various functions described herein. For example, a customer device 102 may be a computing device such as a Personal Computer (PC), a laptop, a telephone, or other device associated with a customer. As used herein, the term "customer" may refer to, for example, an individual or other entity that buys and sells securities (and, pursuant to some embodiments of the present invention, options). For example, a customer operating a customer device 102 may be a broker or other entity desiring to purchase or sell options using features of embodiments of the present invention. The broker or other entity may be operating on behalf of the ultimate purchaser of the securities.

An exchange device 104 may be any computing device(s) operated by or on behalf of one or more securities exchanges. In one particular embodiment, exchange devices 104 are devices or systems operated by or on behalf of exchanges which facilitate the trade of options. For the purposes of describing features of embodiments of the present invention, the five U.S. exchanges identified above will be referenced herein. Each of these exchanges may be in communication with other devices described herein using techniques known in the art. For example, the five U.S. exchanges are in communication with a central entity (the Options Clearing Corporation, or "OCC") which acts as a central clearing organization to process option contract trades. In general, the OCC receives information from the exchanges after the completion of trades, and operates to ensure trades are completed and settled pursuant to their terms.

Exchange device 104 may include one or more operator terminals allowing specialists or traders at the exchange to respond to option orders received and to complete an option order pursuant to its terms.

Market data 112 may be any of a number of different types of options market data received from a variety of data sources and which can be used to facilitate option transactions. For example, in the U.S., intra-day option pricing data is provided by the Option Price Reporting Authority (OPRA). In some embodiments, market data 112 includes a feed of OPRA data. In some embodiments, this OPRA data feed is received by routing system 400 substantially in real-time. This OPRA data feed provides option pricing from each of the options exchanges in the U.S. Those skilled in the art will recognize that other types of market data sources may also be used to assist in the processing and routing of transactions as described herein. For example, daily or monthly transaction volume information may be retrieved from the OCC or other sources and used to support routing decisions. As another example, daily pricing data may be retrieved from different specialists or traders. In some embodiments, this pricing data is retrieved on an as-needed basis (e.g., when a routing decision is being made, a price inquiry may be presented to a particular exchange to identify the exchange's current pricing for the particular option being routed). Market data 112 may be received by routing system 400 on a regular basis or substantially in real-time.

Routing system 400 may be any computing device which is capable of performing the various functions described herein. For example, in some embodiments, routing system 400 may be configured as a Web server adapted to exchange information with customer devices 102, exchanges 104 and sources of market data 112. As used herein, devices (e.g., routing system 400, customer devices 102, exchanges 104 and market data sources 112) may communicate, for example, via one or more communication networks. For example, some or all of the devices may be in communication via an Internet Protocol (IP) network such as the Internet. Some or all of the devices may be in communication via other types of networks such as an intranet, a Local Area Network (LAN), a Metropolitan Area Network (MAN), a Wide Area Network (WAN), a proprietary network, a Public Switched Telephone Network (PSTN), and/or a wireless network.

According to some embodiments of the present invention, routing system 400 communicates with the customer devices 102, exchanges 104 and sources of market data 112 via a temporary computer communication channel (e.g., a logic path through which information can be exchanged). In other words, the communication channel between routing system 400 and other devices may be established and discontinued as appropriate. For example, routing system 400 may exchange information with a customer device 102*a* via a Web site (e.g., when a browser application executing on the customer device 102*a* is accessing the Web site to place an option trade request).

According to some embodiments, routing system 400 communicates with other devices via a public computer communication network. That is, at least a portion of the communication network may be accessed by devices other than routing system 400 and the other devices depicted in FIG. 1. Note, however, that the information exchanged between routing system 400 and other devices of FIG. 1 may be encrypted or otherwise protected to prevent a third party from accessing, manipulating, understanding and/or misusing the information.

According to an embodiment of the present invention, routing system 400 receives option order information from customer devices 102. As used herein, the term "option order" is used to refer to an order involving an offer to purchase or sell securities commonly known as "options". As used herein, each option order includes a number of terms defining the offer to purchase or sell. For example, an option order may include a customer identifier (identifying the party offering to purchase or sell), a symbol (identifying the underlying security associated with the option order), an amount or size of the order (identifying the number, typically in lots of 100, of options desired to be purchased or sold). Each option order may also include information identifying a type of the order. For example, the option order may be immediately executable (e.g., be a market or marketable limit order), or it may have special conditions or instructions associated with the order. Finally, each order may also include information identifying an expiration date of the option contract.

In operation, routing system 400 receives such option order information from customer devices 102 and utilizes the option order information (and, in some embodiments, market data or other information) to make routing decisions. According to some embodiments of the present invention, these routing decisions may be established and implemented in a manner which allows option orders to achieve high execution quality. In some embodiments, these routing decisions are made by comparing the received option order information with one or more stored set(s) of rules. The stored set(s) of rules are used to determine an exchange to which an order will be routed. For example, as will be discussed further below, rules may be established by some customers to indicate particular routing preferences (e.g., one customer may wish that large orders involving IBM options be routed to the CBOE). Other rules may be established which route orders based on symbols, based on specialists or market makers, based on explicit symbols, based on volume statistics, or the like. These rules may vary based on different customer preferences, based on market data, or the like. The result is a system which allows the efficient routing and processing of option orders and which provides high execution quality. Further, in some embodiments, customers and traders are given the flexibility specify and enforce routing rules and requests.

Figure 4:
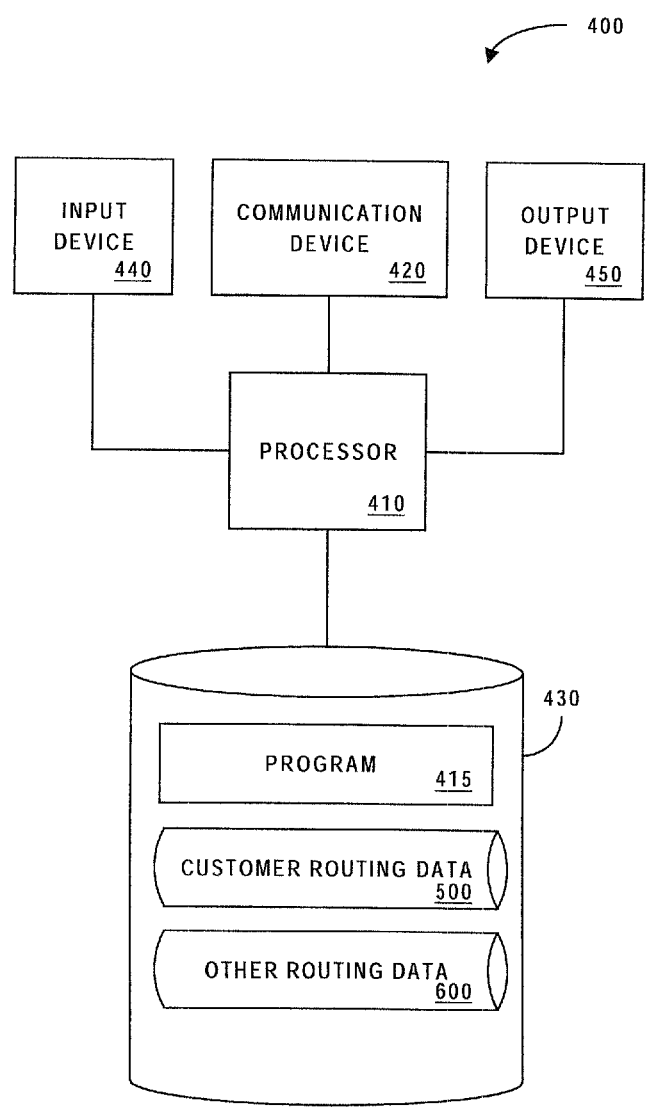
FIG. 4 is a block diagram of one embodiment of a routing system for use in conjunction with the system of FIG. 1.

Reference is now made to FIG. 4 where an embodiment of routing system 400 is shown. As depicted, routing system 400 includes a computer processor operatively coupled to a communication device 420, a storage device 430, an input device 440 and an output device 450. Communication device 420 may be used to facilitate communication with, for example, other devices (such as customer devices 102, exchanges 104 and sources of market data 112). Input device 440 may comprise, for example, a keyboard, a keypad, a mouse or other pointing device, a microphone, knob or a switch, an infra-red (IR) port, a docking station, and/or a touch screen. Input device 440 may be used, for example, to enter information (e.g., information regarding routing rules, option orders, or the like). Output device 450 may comprise, for example, a display (e.g., a display screen), a speaker, and/or a printer.

Storage device 430 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 430 stores one or more programs 415 for controlling processor 410. Processor 410 performs instructions of program 415, and thereby operates in accordance with the present invention. In some embodiments, program 415 may be a rule-based engine which applies routing rules to customer orders. In some embodiments, program 415 may be configured as a neural-network or other type of program using techniques known to those skilled in the art to achieve the functionality described herein.

Storage device 430 also stores databases, including, for example, a customer routing database 500 and one or more databases including other routing data 600. An example of a customer routing database is described below in conjunction with FIG. 5, and example routing data is described below in conjunction with a description of various routing options and features. Those skilled in the art, upon reading this disclosure, will understand that a number of different routing rules and decisions may be utilized.

Figure 5:
FIG. 5 is a table illustrating an exemplary data structure of a customer routing database for use in the present invention.

Referring now to FIG. 5, a table represents a customer order routing database 500 that may be stored at (or accessible by) routing system 400. This database is described in detail below and depicted with exemplary entries in the accompanying figure. As will be understood by those skilled in the art, the schematic illustrations and accompanying descriptions of the databases presented herein are exemplary arrangements for stored representations of information. A number of other arrangements may be employed besides those suggested by the table shown. Similarly, the illustrated entries of the database represent exemplary information only. Those skilled in the art will understand that the number and content of the entries can be different from those illustrated herein.

Customer order routing database 500 (as depicted) includes entries identifying a number of different order routing rules established by or on behalf of customers who desire to route option orders using system 400. For example, these rules may be specified by a customer interacting with system 400 or they may be established on behalf of the customer by an administrator or operator of system 400. In some embodiments, the rules may be established during an initial registration or definition session between a customer and routing system 400. The rules, in some embodiments, may thereafter be updated or modified on an as-desired basis.

The table defines a number of fields 502-508 for each of the entries. The fields specify: a customer identifier 502, a symbol 504, a size 506, and one or more exchange(s) 508. The information in customer order routing database 500 may be created and updated, for example, based on information received from a customer. In some embodiments, routing system 400 includes one or more maintenance terminals which allow authorized individuals to update, modify, and otherwise maintain routing information and rules utilized by the system.

Customer identifier 502 includes data identifying a particular customer who wishes to route option orders using routing system 400. The data may be alphanumeric data used to uniquely identify a particular customer and to identify routing rules associated with that customer. For example, a customer may be an individual or an entity which has established a relationship with an operator of routing system 400 to process and route option orders.

Symbol 504 includes data identifying a particular security symbol for which the customer has provided particular routing rules. As shown in the example data, the customer identified by identifier "C1001" has established two routing rules for the securities identified by the symbol "IBM" and one routing rule for the securities identified by the symbol "AOL". In this manner, customers may specify particular routing rules based on the security underlying their option orders.

Size 506 includes data identifying a size requirement for application of a particular rule. For example, as shown in the example data of FIG. 5, the customer identified by customer identifier "C1001" has established two particular routing rules for transactions involving securities identified by the symbol "IBM". A first rule is used for orders involving the purchase or sale of "IBM" options in lots sized between 0 and 49. A second rule is used for orders involving the purchase or sale of "IBM" options in lots sized greater than 50. Pursuant to embodiments of the present invention, option orders may be routed based on different order sizes, allowing customers to route orders to exchanges or specialists having different trading capacities and allowing trades to execute at a higher quality.

Routing rules and databases pursuant to embodiments of the present invention may also utilize wildcards to allow flexible processing of option orders. For example, the size 506 field of the table of FIG. 5 could include one or more wildcard symbols (e.g., "*") to indicate that option orders of all sizes be routed to a particular exchange. Wildcard symbols could also be utilized in other fields, such as the symbol field 504. Other data could be provided in routing database 500. For example, routing database 500 (or another database stored at or accessible to routing system 400) may include information specifically identifying details of each customer. Information may also be provided specifying a restricted trade list ("RTL") of securities which require special processing. An RTL may be associated with particular customers based on, for example U.S. Securities Exchange Commission ("SEC") regulations. Further routing rules may also be provided, including, for example, rules based on the security underlyer, the order size, the option expiration date, type of order, etc.

Figure 2:
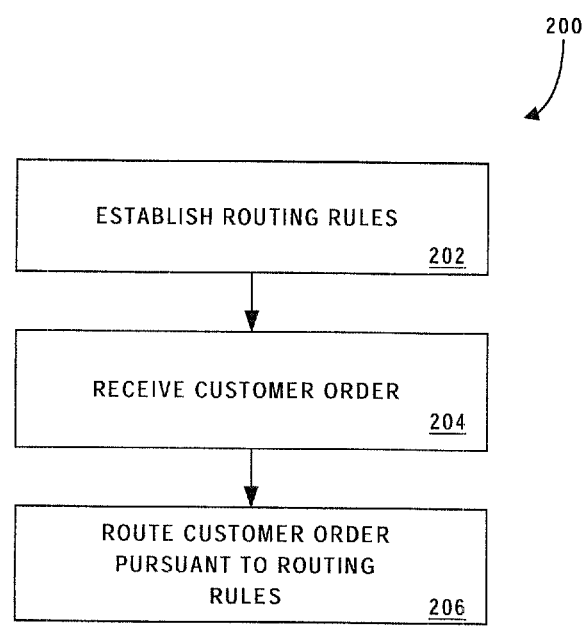
FIG. 2 is a flow diagram illustrating an exemplary process for routing option orders pursuant to one embodiment of the present invention.

Operation of some embodiments of the present invention will now be described by referring to FIG. 2 where a process 200 is shown for routing option orders. The flow chart in FIG. 2 and the flow charts in other figures described herein do not imply a fixed order to the steps, and embodiments of the present invention can be practiced in any order that is practicable. Some or all of the steps of the process shown in FIG. 2 may be performed, for example, by, or on behalf of, a trading entity or service provider operating routing system 400 in conjunction with other devices.

Process 200 begins at 202 where routing rules are established. For example, routing rules may be established by customers who desire to have their option orders routed using the routing system 400 pursuant to embodiments of the present invention. One or more routing rules may also be established by customers, traders or other participants in trading system 100. One or more routing rules may also be established by an entity operating routing system 400. These routing rules, for example, may be stored at (or accessible to) routing system 400 (e.g., in mass storage device 430 of FIG. 4). In some embodiments, process 200 may be performed on an on-going basis (e.g., a customer may continually modify or update its routing rules). In some embodiments, an entity operating routing system 400 may establish a number of common routing rules. Individual customers may then review the common routing rules and choose those that are appropriate to their situation. Individual customers may augment the selected common routing rules with custom routing rules germane to their trading situation.

Once routing rules have been established, processing continues at 204 where a customer option order is received. In some embodiments, customer option orders may be submitted directly from user devices 102 to routing system 400. Orders may be submitted in batch files (e.g., with multiple trade requests) or individually. Each customer option order may include details of the order, including: an identification of the customer, an identification of the underlying security to be purchased or sold, an identification of whether the order is a bid or an ask, the expiration date of the desired option, and/or the size of the offer. Other terms may also be provided (e.g., such as an identification of whether the order is a market or limit order or the like).

Once a customer option order has been received by the routing system 400, terms of the customer order are compared to the rules established at 202. In some embodiments, routing system 400 first determines whether any customer-specified rules apply. For example, a set of customer rules (if they have been established) are identified based on the identity of the customer. The customer rules are compared to the terms of the customer order received at 204 to determine if any particular routing rules apply to the received order. For example, if the customer order was an order to purchase 100 IBM August 60 Calls, processing at 206 may involve determining whether the customer established any routing rules relevant to the order (e.g., such as whether IBM option orders for orders for 100 contracts or more should be routed to a particular exchange). If processing at 206 indicates that rules were established that affect the customer order, the order is routed in accordance with those rules. Processing at 206 may include determining whether other rules have been established (e.g., where no customer specified rules are identified). Once routed, the transaction is processed as a typical option order.

Figure 3:
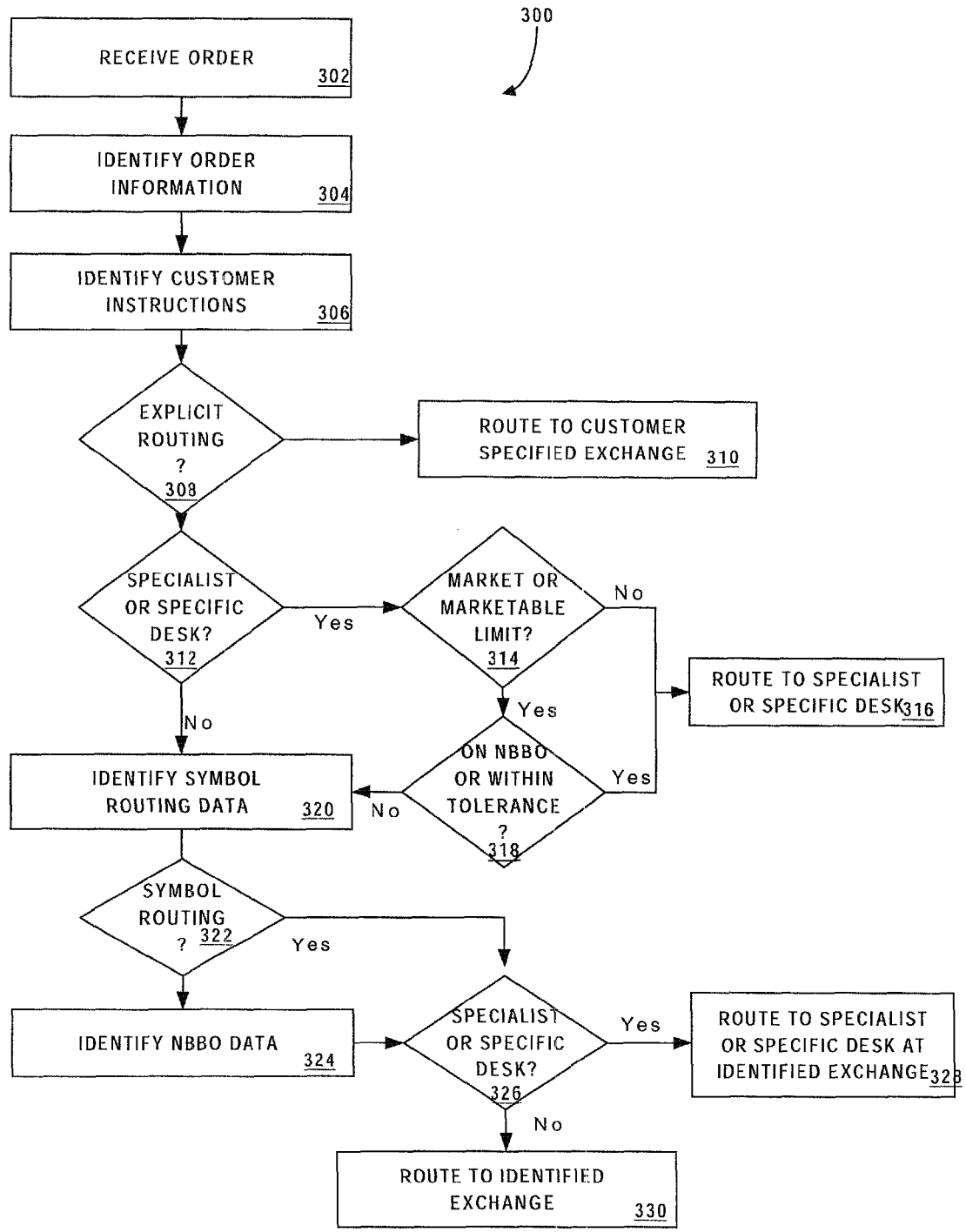
FIG. 3 is a flow diagram illustrating a further exemplary process for routing option orders pursuant to one embodiment of the present invention.

Further details of some embodiments of the present invention will now be described by referring to FIG. 3 where a transaction process 300 is shown. Process 300 may be performed by routing system 400 in conjunction with other devices shown in FIG. 1. Processing begins at 302 where a customer option order is received by routing system 400 (e.g., via the Internet, via telephone or the like). The customer option order includes information identifying the terms of a desired option transaction. Processing continues at 304 where the customer option order information is identified. For example, processing at 304 may include processing terms of the order to identify the customer and details of the options ordered.

Processing continues at 305 where a determination is made whether the security underlyer is contained on a restricted trade list ("RTL") available to or maintained by routing system 400. In some embodiments, RTLs are associated with particular customers and processing at 305 includes determining if a RTL exists for the customer and then determining if the RTL restricts trading of the particular security underlyer contained in the customer option order received at 302. If a relevant RTL exists, and if the underlyer is contained in the RTL, processing proceeds to 307 where the order is rejected. In this manner, customers may enforce compliance with their own established trading rules, ensuring that inappropriate, or otherwise questionable trades are not executed.

If the order does not involve an underlying security which is on a RTL associated with the customer, processing continues at 306 where the customer option order information is compared to one or more rules stored at (or accessible to) routing system 400. In some embodiments, these rules have been previously established by (or on behalf of) the customer. For example, processing at 306 may include identifying one or more database records associated with the customer which include routing rules established by the customer.

Processing continues at 308 where a determination is made whether the customer has established one or more explicit routing rules which are relevant to the received order. For example, if the customer has submitted an order to buy 25 January 100 Calls of IBM, and has established a routing rule indicating that all IBM option orders of between 0 and 49 contracts should be routed to the AMEX, the CBOE or the ISE (in that order as available), then the option order is routed at 310 to the exchange specified by the customer routing rule. In the example, the order would be routed to the AMEX. If the order could not be processed at the AMEX, the order would be routed to the CBOE. In some embodiments, processing at 308 (and, in some embodiments at other steps in process 300) may include tracking which order types, qualifiers, and time in force ("TIF's") are valid on each exchange and determining whether a particular order is of a type which cannot be routed to a particular exchange. For example, a table of information may be maintained which tracks order data that is not valid on each exchange. Processing at 308 may include comparing the option order to this table of information to avoid routing the option order to an exchange which will not be able to support the option order. Fall-back routing rules may be provided in such a situation (e.g,. secondary, tertiary, explicit routes, etc. may be used to properly route the option order to an exchange which can support it).

Similarly, in some embodiments, processing at 308 (and, in some embodiments, at other steps in process 300) may include tracking which products (e.g., by underlyer and individual option) are traded on each exchange. In this manner, option orders involving products which are not traded on a particular exchange will not be routed to that exchange. Fallback routing rules may be applied in these circumstances (e.g., secondary, tertiary, explicit routes, etc. may be used to route the order to an exchange which does support the product).

If a determination is made at 308 that the customer has not established one or more explicit routing rules which apply to the customer option order received at 302, processing continues to 312 where a determination may be made whether the order should be routed to a particular trader (e.g., to a particular specialist or desk). In some embodiments of the present invention, this optional determination may be used to provide further flexibility in the routing of transactions (e.g., to preferred specialists). If a determination is made at 312 that routing rules apply which would route the order to a particular specialist, processing continues to 314 where a determination is made whether the order is a market or marketable limit order. If the order is not a market or marketable limit order, processing continues to 316 where the order is routed to a specialist for execution.

If processing at 314 indicates that the order is a market or marketable limit order, processing continues at 318 where a determination is made whether the specialist identified at 312 currently offers pricing which is on the NBBO or within a specified tolerance of the NBBO. This tolerance can be specified in a number of ways. For example, the required tolerance may be specified as a number of ticks within NBBO, as a percentage of the bid/offer spread, or as a percentage of the price on the side of the order. For example, routing rules associated with a customer may include data identifying a rule that all Intel option orders where the specified specialist is within 1 tick of the NBBO will route to the specified specialist. Similar rules may be established and used to account for exchange automatic step up logic for automatic execution As another example, a routing table may include data identifying a further rule that all Motorola option orders where the specified specialist is at or within 10 percent of the NBBO bid/offer spread will route to the exchange where the specialist trades. As a further example, routing rules associated with a customer may include data identifying a further rule that all Compaq option orders where the specialist is at or within 10 percent of the NBBO on the side of the order (bid-sell, offer-buy) will route to the exchange where the specialist is the primary market maker. In some embodiments, the tolerance is established and maintained by an entity operating routing system 400 rather than by each customer.

If the specified specialist is within the requisite tolerance, the order is routed to the specified desk at 316. If the specified specialist is not within the requisite tolerance, processing continues at 320.

Processing continues at 320 if no specialist or desk was specified (at 312) or if the specified specialist or desk was not within a specified tolerance of NBBO and the order was a market or marketable limit order. Processing at 320 includes identifying symbol data associated with the order, and continues at 322 where routing rules associated with the symbol of the underlying security in the customer option order received at 302 are identified (if any such rules have been established). One or more symbol routing tables may be stored at, or accessible to, routing system 400 and used to route orders for which rules have not yet applied. The symbol routing information may be used to route orders to a specific exchange. In some embodiments, multiple exchanges may be listed in declining preference. For example, a symbol routing table identifying that IBM option orders of sizes less than 100 lots be routed to (in priority sequence): the CBOE, the ISE, and finally to the PCSE. If the option order is an order involving a symbol which is included in the symbol routing table, processing continues at 326 where a further determination may be made whether a particular specialist or desk should be used to execute the order. If none exists, the order is simply routed to the specified exchange. If a specialist is identified, the order is routed to the identified specialist.

If processing at 322 does not identify a symbol routing rule that applies to the received order, processing continues at 324 where NBBO data is identified to route the order. For example, processing at 324 occurs when none of the other rules or decisions has applied to otherwise route the order. Processing at 324 is used to ensure that the order is routed to the exchange having the best pricing. Processing at 324 may include, for example, identifying NBBO pricing by retrieving OPRA data with current exchange pricing. In some embodiments, processing at 324 may involve a tie (e.g., where more than one exchange offers the same pricing). In some embodiments, this tie may be broken by first checking (and routing to) an exchange having a preferred market maker. In some embodiments, this tie may be broken by routing the order to the exchange which traded the most volume (month-to-month, by underlying symbol) the previous month. This data may be retrieved, for example, from the OCC (e.g., at http://onn.theocc.com).

In some embodiments, process 300 may also include processing which allows a customer or other entity to specify exchanges to which orders should not be routed. For example, a customer may indicate a preference that IBM option orders never be routed to the AMEX, even if other routing criteria or decisions described above indicate that the AMEX is the exchange to route to. In some embodiments, these routing prohibitions are established by an entity operating routing system 400 rather than individual customers.

The result is a system which provides a simple and accurate way to allow customers having existing preferences and routing instructions to adapt to more intelligent routing systems. Customers will enjoy increased execution quality and reporting. Customer preferences can be modified and updated throughout the trading day to respond to market changes.

Although the present invention has been described with respect to a preferred embodiment thereof, those skilled in the art will note that various substitutions may be made to those embodiments described herein without departing from the spirit and scope of the present invention. For example, embodiments of the present invention may also be used to provide enhanced reporting and surveillance. For example, routing data and execution quality may be monitored for all transactions which are routed using the system. This allows the system to monitor, analyze and enforce an explicit quality of service for customers. For example, execution quality requirements may be established and enforced using the rules based system described above. Further, the routing system may store and analyze execution quality data to provide additional reporting to customers.

What is claimed is:

1. A method for processing option orders, comprising:
    establishing customer routing rules, wherein said customer routing rules specify a preference for an option exchange;
    receiving, by a processor, an option order, said option order comprising a customer identifier, and a security underlyer and quantity to be purchased or sold according to said option order;
    comparing, using the processor, terms of said option order with said customer routing rules to determine whether said customer routing rules apply to said option order based on said customer identifier, said security underlyer and said quantity;
    wherein, when said customer routing rules lack explicit routing instructions for said option order:
        retrieving current national best bid and offer (NBBO) pricing data for said option order;
        retrieving a specified tolerance between said option order and said current NBBO pricing data within which said option order can be routed to a specialist, wherein said specialist is associated with specialist pricing;
        comparing said current NBBO pricing data to said specialist pricing for said option order to determine if said option order can be routed to said specialist;
        routing said option order to said specialist when said specialist pricing is within said specified tolerance;
    wherein, when said customer routing rule applies to said option order;
    routing, using the processor, said option order to a selected option exchange according to said customer routing rules;
    executing, using the processor, said option order;
    monitoring, using the processor, routing data and execution data of said executed option order;
    determining an execution quality of said executed option order by comparing execution quality requirements to said execution data; and
    reporting said routing data and execution quality to said customer.

2. The method of claim 1, wherein said information identifying said option order includes information identifying an expiration date, and a price, wherein the method further comprises
    comparing said expiration date to said routing rule to identify said selected option exchanges.

3. The method of claim 2, wherein said option order further includes information identifying an order type, wherein said order type is selected from the group consisting of: a market order, and a marketable limit order.

4. The method of claim 3, wherein, when said customer routing rules lack explicit routing instructions for said option order and when said specialist pricing is not within said specified tolerance, the method further comprises:
    identifying, based on said information identifying said option order and said customer routing rules, a second routing rule; and
    routing said option order based on said second routing rule.

5. The method of claim 3, wherein, when said customer routing rules lack explicit routing instructions for said option order and when said specialist pricing is not within said specified tolerance, the method further comprises:
    identifying NBBO data for said option order, said NBBO data including data identifying at least a first exchange having NBBO pricing; and
    routing said option order to said at least first exchange.

6. A method, initiated by a customer, for processing an options order including data identifying said customer, an underlying security, and an amount, the method comprising:
    communicating, using a processor, customer routing rules to a routing system; and
    comparing, using the processor, terms of said option order with said customer routing rules to determine whether said customer routing rules apply to said option order based on said information identifying said customer, said underlying security and said amount;

when said customer routing rules apply to said option order, routing, using the processor, said option order to a selected option exchange according to said customer routing rules;

when said customer routing rules do not apply to said option order:

identifying by the processor, a symbol identifying said underlying security;

determining by the processor whether a symbol routing rule is associated with said symbol of the underlying security;

routing, by the processor, said option order to an exchange in accordance with said symbol routing rule when said symbol routing rule is associated with the symbol of the underlying security;

retrieving current current national best bid and offer (NBBO) pricing data for said option order;

retrieving a specified tolerance between said option order and said current NBBO pricing data within which said option order can be routed to a specialist, wherein said specialist is associated with specialist pricing;

comparing said current NBBO pricing data to said specialist pricing for said option order to determine if said option order can be routed to said specialist;

routing said option order to said specialist when said specialist pricing is within said specified tolerance executing by the processor the option order in the routed exchange; and determining an execution quality of said executed option order by comparing execution quality requirements to execution data associated with said executed option order.

7. The method of claim 6, wherein said customer routing rules include explicit routing instructions for options orders including at least a first security underlyer.

8. The method of claim 6, further comprising:
communicating a restricted trade list to said routing system, said restricted trade list including a plurality of security underlyers which cannot be traded by said customer.

9. A method for processing option orders, comprising:
receiving, by a processor, an option order, said option order including information identifying a customer, a security underlyer, and a quantity;

verifying, using the processor, that said security underlyer is not one of a plurality of restricted security underlyers associated with a restricted list of said customer;

retrieving current national best bid and offer (NBBO) pricing data for said option order;

retrieving a specified tolerance between said option order and said current NBBO pricing data within which said option order can be routed to a specialist, wherein said specialist is associated with specialist pricing;

comparing said current NBBO pricing data to said specialist pricing for said option order to determine if said option order can be routed to said specialist;

routing said option order to said specialist when said specialist pricing is within said specified tolerance;

executing, using the processor, said option order;

monitoring, using the processor, routing data and execution data of said executed option order;

determining an execution quality of said executed option order by comparing execution quality requirements to said execution data; and reporting said routing data and execution quality to said customer.

10. A method for processing option orders, comprising:
receiving, by a processor, an option order, said option order including information identifying a customer, and information identifying a desired option;

identifying, by the processor, a symbol identifying a security underlyer associated with said desired option;

determining, by the processor, whether a symbol routing rule is associated with said symbol of said security underlyer;

routing, by the processor, said option order to an exchange in accordance with said symbol routing rule when said symbol routing rule is associated with said symbol of said security underlyer;

retrieving current national best bid and offer (NBBO) pricing data for said option order;

retrieving a specified tolerance between said option order and said current NBBO pricing data within which said option order can be routed to a specialist, wherein said specialist is associated with specialist pricing;

comparing said current NBBO pricing data to said specialist pricing for said option order to determine if said option order can be routed to said specialist;

routing said option order to said specialist when said specialist pricing is within said specified tolerance;

executing, by the processor, the option order in the routed exchange; and determining an execution quality of said executed option order by comparing execution quality requirements to execution data associated with said executed option order.

11. The method of claim 10, wherein said specified tolerance near NBBO pricing is within 0-20% of NBBO pricing.

12. The method of claim 10, further comprising:
identifying an exchange having pricing for said option near NBBO pricing; and routing said option order to the exchange having pricing nearest the NBBO pricing for said option.

13. A routing apparatus, comprising:
a processor; and a storage device in communication with said processor and storing instructions adapted to be executed by said processor to:

receive an option order, said option order including information identifying a customer, an underlying security and a desired quantity; and receive customer routing rules, wherein said customer routing rules specify a preference for an option exchange, wherein said customer routing rules comprise rules based on said desired quantity and said underlying security;

compare terms of said option order with said customer routing rules to determine whether said customer routing rules apply to said option order based on said information identifying said customer, said underlying security and said desired quantity;

when said customer routing rules apply to said option order, forward said option order to a selected one of a plurality of option exchanges to complete said option order, said forwarding based at least in part on one of said information identifying said customer, said underlying security and said desired quantity;

when said customer routing rules lack explicit routing instructions for said option order:

retrieve current national best bid and offer (NBBO) pricing data for said option order;

retrieving a specified tolerance between said option order and said current NBBO pricing data within which said option order can be routed to a specialist, wherein said specialist is associated with specialist pricing;

comparing said current NBBO pricing data to said specialist pricing for said option order to determine if said option order can be routed to said specialist;

routing said option order to said specialist when said specialist pricing is within said specified tolerance;

execute the option order;

monitor routing data and execution data of said executed option order;

determine an execution quality of said executed option order by comparing execution quality requirements to said execution data; and report said routing data and execution quality to said customer.

14. The routing apparatus of claim 13, wherein said storage device further stores a routing database.

15. The apparatus of claim 13, further comprising:
a communication device coupled to said processor and adapted to communicate with at least one of a customer device and an exchange device.

16. A non-transitory medium storing instructions adapted to be executed by a processor to perform a method of routing an options order, said method comprising:

receiving an option order, said option order including information identifying a customer, an underlying security and a desired quantity; and receiving customer routing rules, wherein said customer routing rules specify a preference for an option exchange;

comparing terms of said option order with said customer routing rules to determine whether said customer routing rules apply to said option order based on said information identifying said customer, said underlying security, and said desired quantity when said customer routing rules apply to said option order, forwarding said option order to a selected one of a plurality of option exchanges to complete said option order, said forwarding based at least in part on one of said information identifying said customer, said underlying security and said desired quantity;

when said customer routing rules do not apply to said option order:

retrieving current national best bid and offer (NBBO) pricing data for said option order;

retrieving a specified tolerance between said option order and said current NBBO pricing data within which said option order can be routed to a specialist, wherein said specialist is associated with specialist pricing;

comparing said current NBBO pricing data to said specialist pricing for said option order to determine if said option order can be routed to said specialist;

routing said option order to said specialist when said specialist pricing is within said specified tolerance;

executing the option order;

monitoring routing data and execution data of said executed option order;

determining an execution quality of said executed option order by comparing execution quality requirements to said execution data; and reporting said routing data and execution quality to said customer.

17. The method of claim 1 wherein when said customer routing rules lack explicit routing instructions for said option order and when said specialist pricing is not within said specified tolerance, the method further comprises routing, using the processor, said option order to an option exchange with national best bid and offer (NBBO) pricing comprising:

identifying multiple option exchanges to route said option order;

retrieving data identifying which of said multiple option exchanges traded a highest volume of said security underlyer during a previous time period; and routing said option order to said identified one of said multiple option exchanges.

18. The method of claim 9 wherein when said customer routing rules lack explicit routing instructions for said option order and when said specialist pricing is not within said specified tolerance, the method further comprises:

routing, using the processor, said option order to an option exchange with national best bid and offer (NBBO) pricing comprising:

identifying multiple option exchanges to route said option order;

retrieving data identifying which of said multiple option exchanges traded a highest volume of said security underlyer during a previous time period; and routing said option order to said identified one of said multiple option exchanges.

19. The non-transitory medium of claim 16, the non-transitory medium storing instructions adapted to be executed by the processor to perform the method of routing the options order, wherein when said customer routing rules lack explicit routing instructions for said option order and when said specialist pricing is not within said specified tolerance, said method further comprises:

routing, using the processor, said option order to an option exchange with national best bid and offer (NBBO) pricing;

identifying multiple option exchanges to route said option order;

retrieving data identifying which of said multiple option exchanges traded a highest volume of said security underlyer during a previous time period; and routing said option order to said identified one of said multiple option exchanges.

* * * * *